Aug. 20, 1929.  R. J. NEIL  1,725,595
CINEMATOGRAPH APPARATUS
Filed Aug. 22, 1927  4 Sheets-Sheet 1

Inventor
Richard J. Neil
By George A. Prevost
atty.

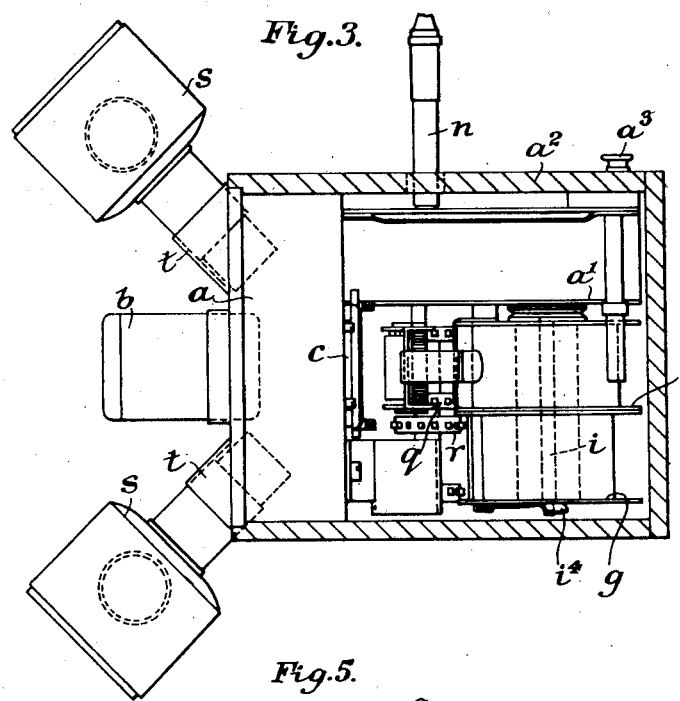
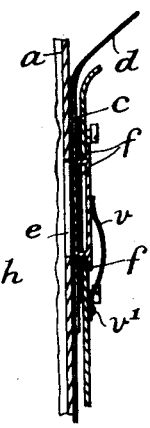
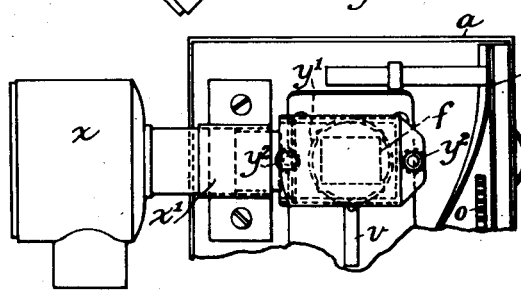
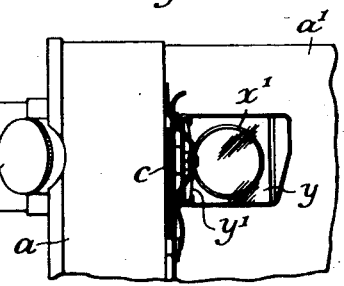
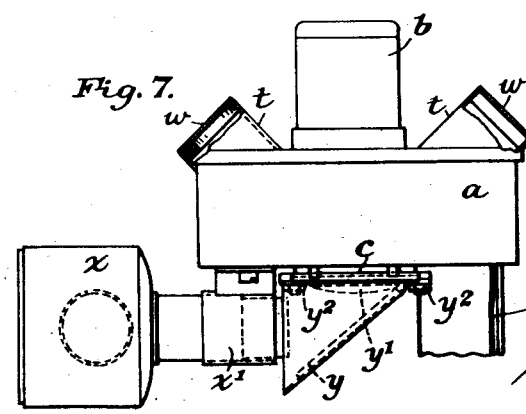

Aug. 20, 1929.  R. J. NEIL  1,725,595
CINEMATOGRAPH APPARATUS
Filed Aug. 22, 1927  4 Sheets-Sheet 3

Inventor
Richard J. Neil
By George A. Prevost
atty.

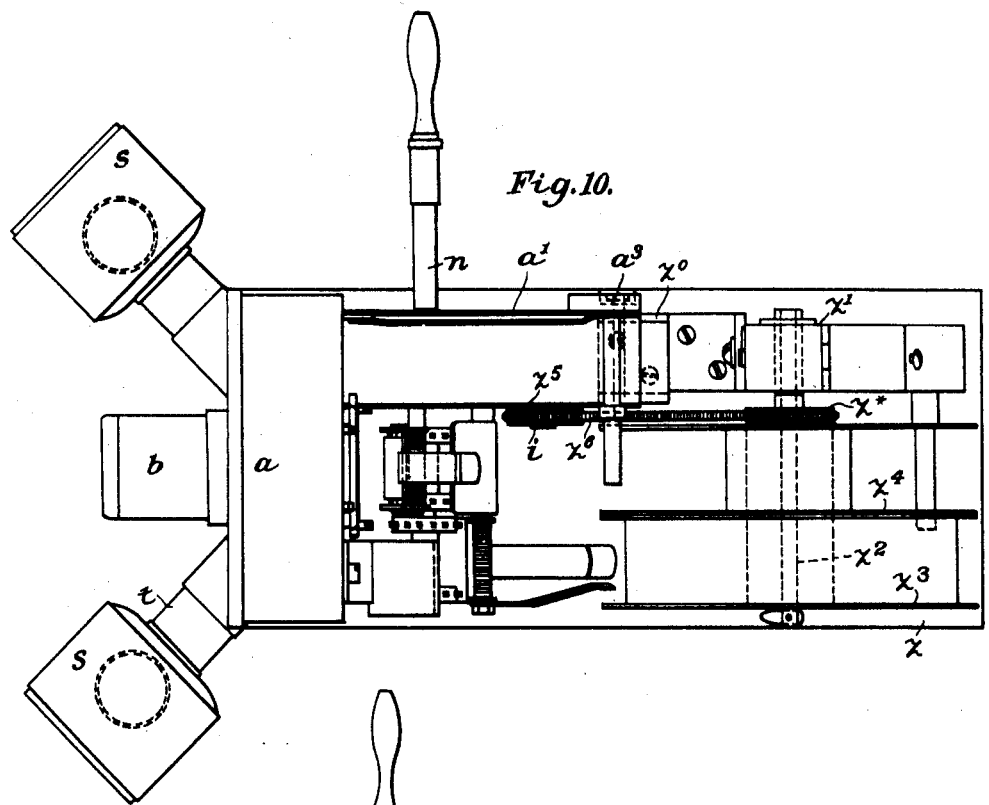
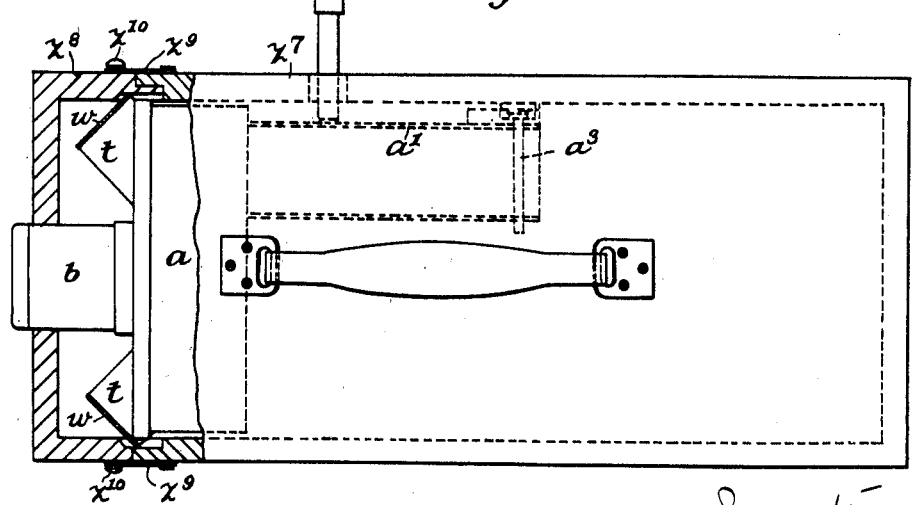

Patented Aug. 20, 1929.

1,725,595

UNITED STATES PATENT OFFICE.

RICHARD JAMES NEIL, OF DALSTON, LONDON, ENGLAND, ASSIGNOR OF ONE-HALF TO CHARLES WILLIAM RETTIG, OF LONDON, ENGLAND.

CINEMATOGRAPH APPARATUS.

Application filed August 22, 1927, Serial No. 214,755, and in Great Britain October 4, 1926.

This invention relates to cinematograph apparatus.

According to the invention I provide a combined camera and projector apparatus for taking pictures on, and projecting them from, either opaque or transparent films, wherein the apparatus has openings so positioned and constructed that they may be fitted with detachable housings for lamps serving to illuminate the opaque film to be projected, and capable of being fitted with closures when the said housings are removed to allow the apparatus to be used as a camera.

In a suitable arrangement for carrying out the invention I employ a combined camera and projector of the type employed for taking and projecting transparent or celluloid films, having a lens common to both operations, and I provide it on either side of the said lens with an aperture for a detachable housing for an electric lamp placed at such an angle that the light of both lamps will be directed on to the face of an opaque or paper film when it is required to project the pictures on the latter through the lens. Both kinds of film are intermittently traversed in a guide or race between apertures co-axial with the lens in the known way, and a third detachable housing is fitted to the rear of the apparatus for the reception of an electric lamp for the purpose of projecting the transparent or celluloid films.

A detachable cap or shutter is fitted to the aperture at the rear of the film to prevent light reaching the back of or fogging the paper or celluloid film when taking photographs thereon. It also prevents the paper film from being overheated while being projected. The cap or shutter is held in position by suitable means such as a spring clip pivoted so that it can be moved out of line with the aperture when the cap is removed from the latter.

When using the apparatus as a camera, the lamp housings at the front thereof are removed from the apertures containing them and suitable caps are fitted into the said apertures.

The apparatus is preferably made of small dimensions for portability and consequently carries comparatively short lengths of film, and where it is required to make use of longer films a suitable attachment is provided to carry the latter.

To enable the invention to be fully understood I will describe it by reference to the accompanying drawings, in which:—

Figures 1, 2 and 3 are, respectively, a sectional side view, a sectional rear view and a sectional plan view of a combined camera and projector for either opaque or transparent cinematograph films, constructed in accordance with the invention and arranged for projecting the pictures of an opaque or paper film.

Figure 4 is a section on the line 4—4, Figure 2.

Figures 5, 6 and 7 are, respectively, a rear view, a side view and a plan view of a portion of the apparatus, but arranged for projecting the pictures of a transparent or celluloid film.

Figures 8, 9 and 10 are, respectively, a side view, a rear view and a plan view of the apparatus, as shown in Figures 1 to 3, provided with the attachment for supporting a comparatively long film, and Figure 11 is a plan view of the apparatus as in Figures 8 to 10 but showing it enclosed for use as a camera.

$a$ is the part of the frame of the cinematograph apparatus provided with the lens $b$ for taking and projecting pictures and the guide or race $c$ for the opaque or transparent film $d$, $e$ and $f$ being the apertures in the said guide co-axial with the lens $b$. $g$ and $h$ are the two spools arranged side by side on the driving spindle $i$ from which the film $d$ is respectively fed to and received from, the race $c$ the said spindle being arranged in bearings in a rearward extension $a^1$ of the frame $a$ and being driven by a pulley $j$ on the said spindle, spring driving band $k$ and pulley $l$ on a shaft $m$ operated by a crank-lever $n$ through the medium of gear-wheels $o$, $p$. The shaft $m$ also carries sprocket-wheels $q$, $r$ for actuating the film and also actuates the mechanism, not shown, for feeding the film $d$ down through the race $c$ and rotating the usual shutter, also not shown, arranged between the lens $b$ and part of the film $d$ in the race $c$. $a^2$ is a case for enclosing the apparatus when employed as a camera, the said case being removed when projecting transparent films. The case $a^2$ is secured to the frame $a^1$ by a screw $a^3$.

Figure 8:
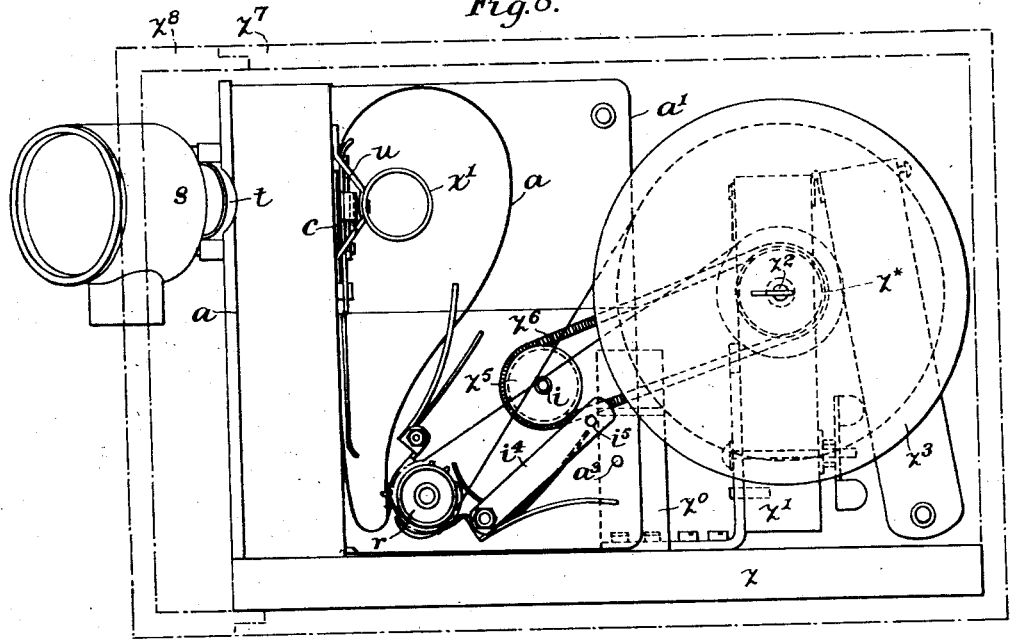

A portion of the spindle $i$ carrying the spools $g$, $h$ is made detachable from the remainder of the spindle for a purpose hereinafter referred to, it being shown provided with a reduced portion $i^1$ fitting in a socket $i^2$ and in keyed relation therewith by a key $i^3$ which also engages a key-way in the boss of the spool $h$. This detachable part of the spindle $i$ is held in position by a pivoted spring blade or clip $i^4$ having a hole $i^5$ to engage with the outer end of the said detachable part of the spindle $i$, so that when it is required to remove this part of the spindle together with the spools $g$ and $h$ it is only necessary to disengage the spring blade $i^4$ from the said spindle and turn it on its pivot out of the way as indicated in Figure 8.

$s$, $s$ are the housings for the electric lamps for illuminating an opaque or paper film, these housings fitting into sockets $t$, $t$ arranged in the front of the frame $a$ and at such an angle that the light from the said lamps will be concentrated on the part of the film displayed through the aperture $e$. By this arrangement it will be seen that the pictures on the opaque or paper film can be projected through the lens $b$.

Figure 1:
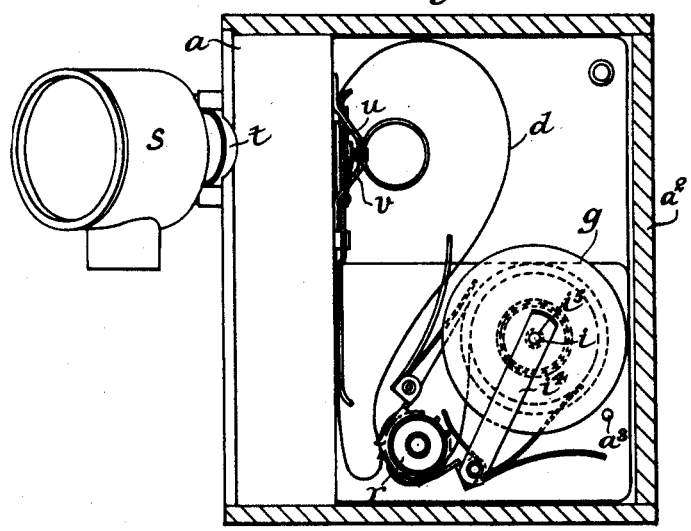
Figure 2:
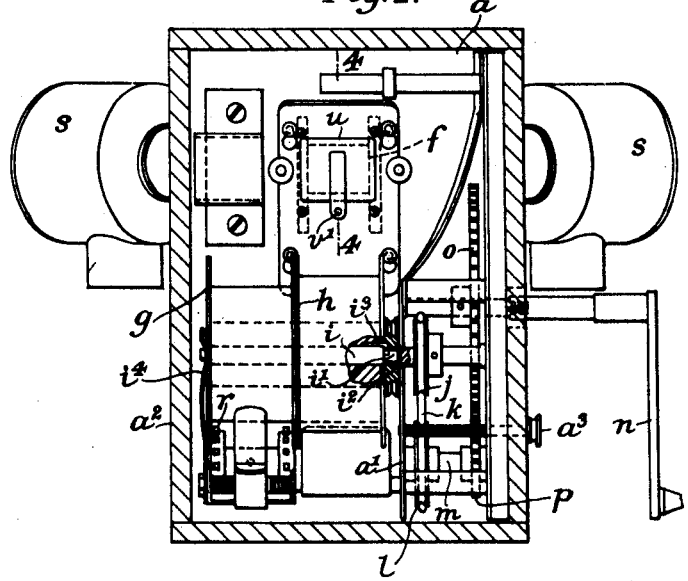

$u$, Figures 2 and 4, is the detachable cap or shutter which I fit into the aperture $f$ behind the film $d$, when the apparatus is being used as a camera, and to prevent the film when of paper from becoming overheated during projection, the said cap being held in position by the spring clip $v$ pivoted at $v^1$.

To use the apparatus as a camera, the housings $s$ are removed and caps $w$, $w$, Figure 7, fitted to the sockets $t$, $t$ to prevent access of light to either an opaque or transparent film $d$, except by way of the lens $b$, the detachable cap or shutter $u$ being retained in position in the aperture $f$ to prevent access of light to the back of the film.

When projecting a transparent film located in the race $c$ a detachable housing $x$ Figures 5 to 7, is fitted to the rear of the frame $a$ through the medium of the socket $x^1$ and which housing contains an electric lamp, the light from which is directed by an inclined mirror $y$ through a lens $y^1$ and said film, the lens $y^1$ enlarging the field of illumination.

The combined mirror and lens are fixed in position behind the aperture $f$ by screws and nuts $y^2$, $y^2$, the cap or shutter $u$ being first removed from the aperture $f$ and the spring clip $v$ turned on its pivot out of the way, as indicated clearly in Figure 5.

Figure 9:
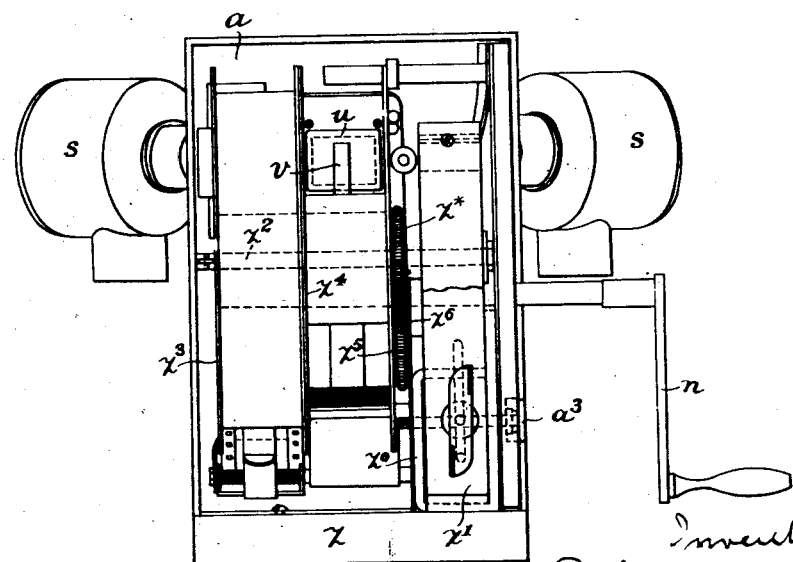

Figures 8 to 10 show the attachment to enable the apparatus to be used with longer films than the apparatus illustrated in Figures 1 to 7, the portion of the spindle $i$ carrying the spools $g$ and $h$ being detached in the manner hereinbefore referred to. This attachment comprises the base $z$ carrying the upright bracket $z^0$ for securing the attachment to the apparatus by the screw $a^3$.

The base $z$ also carries an upright bracket $z^1$, having a bearing in which is journalled a spindle $z^2$ on which is mounted a pair of spools $z^3$, $z^4$ similar to the spools $g$, $h$, respectively, the spool $z^4$ being operated by a pulley $z^*$ keyed to the spindle $z^2$ from a pulley $z^5$ on the spindle $i$ through the medium of a spring driving band $z^6$, whilst the spool $z^3$ is free on the said spindle.

When using the apparatus shown in Figures 8 to 10 as a camera, an enclosing two-part casing $z^7$, $z^8$ is employed, as indicated by the dot and dash lines in figure 8 and in full lines, figure 11, the apparatus being slid into the part $z^7$, whilst the part $z^8$ is fitted to the front of the said part $z^7$ and secured thereto in any suitable way, for instance, by hooks $z^9$ pivoted on the one part engaging pins $z^{10}$ on the other part.

Claims:

1. A combined camera and projector for taking cinematograph pictures on, and projecting them from, either opaque or transparent film, comprising a closed casing, a system of lenses at the front thereof for taking or projecting the pictures, means for intermittently moving a picture film in a race in a direction at right angles to the lens system so that the film can receive rays of light from objects in front of the lens system or project light through the said lens system, a plurality of openings in the said casing front adapted to receive housings for lamps for illuminating the film, or closures when the lamps are not required, and an opening in the side of the casing at the rear of the film race adapted to receive a housing for a lamp, or a closure when the lamp is not required, and means for directing the light of said lamp through the film and through the lens system for projecting purposes.

2. A combined camera and projector for taking cinematograph pictures on, and projecting them from, either opaque or transparent film, comprising a closed casing, a system of lenses at the front thereof for taking or projecting the pictures, means for intermittently moving a picture film in a race in a direction at right angles to the lens system, so that the film can receive rays of light from objects in front of the lens system or project light through the said lens system, a plurality of openings in the said casing front adapted to receive housings for lamps for illuminating the film, or closures when the lamps are not required, and an opening in the side of the casing at the rear of the film race adapted to receive a housing for a lamp, or a closure when the lamp is not required, and means for directing the light of said lamp through the film and through the lens system for projecting purposes, comprising a mirror for deflecting the light and a lens for enlarging the field of illumination.

3. A combined camera and projector for taking cinematograph pictures on, and projecting them from, either opaque or transparent film, comprising a closed casing, a system of lenses at the front thereof for taking or projecting the pictures, means for intermittently moving a picture film in a race in a direction at right angles to the lens system so that the film can receive rays of light from objects in front of the lens system or project light through the said lens system, a plurality of openings in the said casing front adapted to receive housings for lamps for illuminating the film, or closures when the lamps are not required, and an opening in the side of the casing at the rear of the film race adapted to receive a housing for a lamp, or a closure when the lamp is not required, means for directing the light of said lamp through the film and through the lens system for projecting purposes, a spool for feeding the film to the race, a spool for receiving the film from the race, a driving spindle on which the spools are arranged side by side and which is in keyed relation with one of the spools, the portion of the spindle carrying the spools being detachable from the remainder of said spindle to enable the said spools to be removed, a second driving spindle to be used instead of said detachable spindle to carry the film spools, means for supporting the said second spindle, and means for driving the latter from the said remainder of the first mentioned spindle.

RICHARD JAMES NEIL.